United States Patent
King et al.

(10) Patent No.: US 10,702,743 B2
(45) Date of Patent: Jul. 7, 2020

(54) DATA PROCESSING INSIDE GAMING DEVICE

(71) Applicant: Russell Brands, LLC, Bowling Green, KY (US)

(72) Inventors: Kevin King, Dublin, OH (US); Matthew Anthony Tyson, Columbus, OH (US); Mark Joseph Davisson, Rensselaer, IN (US)

(73) Assignee: Russell Brands, LLC, Bowling Green, KY (US)

( * ) Notice: Subject to any disclaimer, the term of this patent is extended or adjusted under 35 U.S.C. 154(b) by 0 days.

(21) Appl. No.: 16/120,350

(22) Filed: Sep. 3, 2018

(65) Prior Publication Data

US 2018/0374012 A1   Dec. 27, 2018

Related U.S. Application Data (63) Continuation of application No. 15/936,218, filed on Mar. 26, 2018, now Pat. No. 10,210,471, which is a
(Continued)

(51) Int. Cl.
*A63B 24/00* (2006.01)
*G06Q 10/06* (2012.01)

(52) U.S. Cl.
CPC ......... *A63B 24/00* (2013.01); *G06Q 10/0639* (2013.01); *A63B 2024/0068* (2013.01); *A63B 2024/0071* (2013.01); *A63B 2220/833* (2013.01)

(58) Field of Classification Search
CPC .................................. G06Q 10/0639
See application file for complete search history.

(56) References Cited

U.S. PATENT DOCUMENTS 3,229,976 A   1/1966 Walter, Jr.
4,479,649 A   10/1984 Newcomb
(Continued)

FOREIGN PATENT DOCUMENTS

CN   1814333        8/2006
CN   101367013 A   2/2009
(Continued)

OTHER PUBLICATIONS

"Built-in Speed Sensor Records How Fast You Throw the Ball—Used as a Training Aid for Pitchers," Markwort Sporting Goods Company [online], [retrieved on May 22, 2012] Retrieved from the Internet:<URL: http://www.markwort.com/featured/speedsensor.asp>.
(Continued)

*Primary Examiner* — Jason T Yen
(74) *Attorney, Agent, or Firm* — Jacob W Neu; Bradley Arant Boult Cummings, LLP (57) ABSTRACT

A computer-implemented method is disclosed that includes capturing data about motion of a sports object caused by one or more athletes manipulating the sports object, transmitting the captured data out of the sports object wirelessly in real time while the one or more athletes are still manipulating the sports object, and presenting information that incorporates the captured data about motion of the sports objects with one or more wearable devices.

7 Claims, 6 Drawing Sheets

Related U.S. Application Data continuation of application No. 14/631,109, filed on Feb. 25, 2015, now Pat. No. 9,940,600.

(60) Provisional application No. 61/946,702, filed on Feb. 28, 2014.

(56) References Cited

U.S. PATENT DOCUMENTS

| | | | |
|---|---|---|---|
| 4,577,865 A | 3/1986 | Shishido | |
| 4,776,589 A | 10/1988 | Yang | |
| 5,102,131 A | 4/1992 | Remington | |
| 5,236,383 A | 8/1993 | Connelly | |
| 5,269,519 A * | 12/1993 | Malone | A63B 69/36 473/154 |
| 5,609,411 A | 3/1997 | Wang | |
| 5,779,576 A | 7/1998 | Smith et al. | |
| 5,810,685 A | 9/1998 | Willner | |
| 5,888,156 A | 3/1999 | Cmiel et al. | |
| 6,013,007 A | 1/2000 | Root et al. | |
| 6,148,271 A | 11/2000 | Marinelli | |
| 6,196,932 B1 | 3/2001 | Marsh | |
| 6,251,035 B1 | 6/2001 | Fa | |
| 6,422,960 B1 | 7/2002 | Touhey et al. | |
| 6,503,086 B1 * | 1/2003 | Golubov | A63B 24/0003 434/247 |
| 6,565,449 B2 | 5/2003 | Buhler | |
| 6,582,330 B1 | 6/2003 | Rehkemper et al. | |
| 6,671,390 B1 | 12/2003 | Barbour et al. | |
| 6,744,375 B1 | 6/2004 | Groos | |
| 6,757,572 B1 | 6/2004 | Forest | |
| 6,856,934 B2 | 2/2005 | Vock et al. | |
| 7,014,581 B2 | 3/2006 | Ng | |
| 7,021,140 B2 | 4/2006 | Perkins | |
| 7,072,789 B2 | 7/2006 | Vock et al. | |
| 7,092,846 B2 | 8/2006 | Vock et al. | |
| 7,162,392 B2 | 1/2007 | Vock et al. | |
| 7,192,387 B2 | 3/2007 | Mendel | |
| 7,234,351 B2 | 6/2007 | Perkins | |
| 7,273,431 B2 | 9/2007 | Devall | |
| 7,308,818 B2 | 12/2007 | Considine et al. | |
| 7,625,314 B2 | 12/2009 | Ungari et al. | |
| 7,643,895 B2 | 1/2010 | Gupta et al. | |
| 7,813,821 B1 | 10/2010 | Howell | |
| 7,891,666 B2 | 2/2011 | Kuenzler et al. | |
| 7,899,307 B1 | 3/2011 | Hughes | |
| 7,998,004 B2 | 8/2011 | Klein | |
| 8,070,654 B2 | 12/2011 | Chapa et al. | |
| 8,078,478 B2 | 12/2011 | Fleming et al. | |
| 8,083,646 B2 | 12/2011 | Chapa | |
| 8,086,421 B2 | 12/2011 | Case, Jr. et al. | |
| 8,109,858 B2 | 2/2012 | Redmann | |
| 8,112,251 B2 | 2/2012 | Case, Jr. et al. | |
| 8,128,410 B2 | 3/2012 | Prstojevich | |
| 8,152,695 B2 | 4/2012 | Riley et al. | |
| 8,172,722 B2 | 5/2012 | Molyneux et al. | |
| 8,206,219 B2 | 6/2012 | Shum et al. | |
| 8,231,487 B2 | 7/2012 | Nurnberg | |
| 8,231,506 B2 | 7/2012 | Molyneux et al. | |
| 8,465,376 B2 | 6/2013 | Bentley | |
| 8,517,870 B2 | 8/2013 | Crowley et al. | |
| 8,540,560 B2 | 9/2013 | Crowley et al. | |
| 8,579,632 B2 | 11/2013 | Crowley et al. | |
| 8,597,095 B2 | 12/2013 | Crowley et al. | |
| 8,663,040 B2 | 3/2014 | Kortegast | |
| 8,951,106 B2 | 2/2015 | Crowley et al. | |
| 2003/0207718 A1 | 11/2003 | Perlmutter | |
| 2003/0224885 A1 | 12/2003 | Leal | |
| 2003/0228934 A1 | 12/2003 | Corzilius | |
| 2005/0069853 A1 | 3/2005 | Tyson | |
| 2005/0288133 A1 | 12/2005 | Rudell | |
| 2006/0025282 A1 | 2/2006 | Redmann | |
| 2006/0135297 A1 | 6/2006 | Cruciani | |
| 2006/0148594 A1 | 7/2006 | Saintoyant et al. | |
| 2006/0166737 A1 | 7/2006 | Bentley | |
| 2006/0189386 A1 | 8/2006 | Rosenberg | |
| 2006/0247070 A1 | 11/2006 | Funk et al. | |
| 2007/0021244 A1 | 1/2007 | Ko | |
| 2007/0026975 A1 | 2/2007 | Marty et al. | |
| 2007/0207873 A1 | 9/2007 | Rose | |
| 2007/0281811 A1 | 12/2007 | Wang | |
| 2008/0015064 A1 | 1/2008 | Nelson | |
| 2008/0026877 A1 | 1/2008 | Neel | |
| 2008/0139307 A1 | 6/2008 | Ueshima | |
| 2008/0144964 A1 | 6/2008 | Soinio et al. | |
| 2008/0269016 A1 | 10/2008 | Ungari | |
| 2008/0300905 A1 | 12/2008 | Kelley, III | |
| 2009/0029754 A1 | 1/2009 | Slocum et al. | |
| 2009/0047645 A1 | 2/2009 | Dibenedetto et al. | |
| 2009/0048044 A1 * | 2/2009 | Oleson | A63B 24/0062 473/570 |
| 2009/0048070 A1 | 2/2009 | Vincent et al. | |
| 2009/0112629 A1 | 4/2009 | Steelberg | |
| 2009/0189982 A1 | 7/2009 | Tawiah | |
| 2009/0210078 A1 | 8/2009 | Crowley et al. | |
| 2009/0298650 A1 | 12/2009 | Kutliroff | |
| 2009/0325739 A1 | 12/2009 | Gold | |
| 2010/0048302 A1 | 2/2010 | Lutnick | |
| 2010/0053324 A1 | 3/2010 | Kim | |
| 2010/0069181 A1 | 3/2010 | Lin | |
| 2010/0105480 A1 | 4/2010 | Mikhailov et al. | |
| 2010/0130315 A1 | 5/2010 | Steidle | |
| 2010/0184563 A1 * | 7/2010 | Molyneux | A43B 1/0054 482/1 |
| 2010/0285903 A1 | 11/2010 | Nicodem | |
| 2011/0008761 A1 | 1/2011 | Hakopian et al. | |
| 2011/0077112 A1 | 3/2011 | Erario | |
| 2011/0118062 A1 | 5/2011 | Krysiak | |
| 2011/0220634 A1 | 9/2011 | Yeh | |
| 2011/0227820 A1 | 9/2011 | Haddick et al. | |
| 2011/0316529 A1 | 12/2011 | Stancil | |
| 2012/0029666 A1 | 2/2012 | Crowley et al. | |
| 2012/0040317 A1 | 2/2012 | Anderson | |
| 2012/0058845 A1 | 3/2012 | Crowley et al. | |
| 2012/0244969 A1 | 3/2012 | Binder | |
| 2012/0129138 A1 | 5/2012 | Redmann | |
| 2012/0231906 A1 | 9/2012 | Barry | |
| 2012/0293548 A1 | 11/2012 | Perez et al. | |
| 2013/0079906 A1 | 3/2013 | Crowley | |
| 2013/0171596 A1 | 7/2013 | French | |
| 2013/0203518 A1 * | 8/2013 | Hatton | A63B 53/047 473/223 |
| 2013/0225305 A1 * | 8/2013 | Yang | A63F 13/00 473/152 |
| 2013/0293580 A1 | 11/2013 | Spivack | |
| 2014/0031151 A1 | 1/2014 | Crowley et al. | |
| 2014/0039651 A1 | 2/2014 | Crowley | |
| 2014/0081436 A1 | 3/2014 | Crowley et al. | |
| 2014/0106833 A1 | 4/2014 | Mohn et al. | |
| 2015/0025660 A1 * | 1/2015 | Prassler | A63B 21/0615 700/91 |

FOREIGN PATENT DOCUMENTS

| | | |
|---|---|---|
| EP | 1637192 | 3/2006 |
| EP | 1637192 | 10/2008 |
| JP | 22007014671 | 1/2007 |
| KR | 380001317 | 4/1988 |
| KR | 20000055834 | 9/2000 |
| KR | 20010008367 | 2/2001 |
| WO | 1995034351 | 12/1995 |
| WO | 1999016511 | 4/1999 |
| WO | 2003022369 | 10/2003 |
| WO | 2009102813 | 8/2009 |
| WO | 2010111705 | 9/2010 |
| WO | 2012033732 | 3/2012 |
| WO | 2014008134 | 1/2014 |
| WO | 2014008202 | 1/2014 |
| WO | 2015130748 | 9/2015 |

(56) References Cited

FOREIGN PATENT DOCUMENTS

| WO | 2015130773 | 9/2015 |
|---|---|---|
| WO | 2015195739 | 12/2015 |

OTHER PUBLICATIONS

"Intelligent Basketball Tracks Trajectory," Freescale [online] [retrieved on May 23, 2012]. Retrieved from the Internet: <URL: http://www.freescale.com/webapp/sps/site/overview.jsp?code=CASE-STUDY-INTELLIGENT-BASKETBALL>, 2 pages.
"Speed Sensor (TM) Programmable Balls," Markwort [online], [retrieved on May 25, 2012]. Retrieved from the Internet: , 2 pages.
International Preliminary Report on Patentability in International Application No. PCT/US2015/017456, dated Sep. 6, 2016, 7 pages.
Authorized Officer D. Kim, International Search Report and Written Opinion for PCT/US2010/029068, dated Oct. 21, 2010, 13 pages.
Authorized Officer R.A. Kwang Pyo, International Search Report/Written Opinion in PCT/US2009/033831 dated Sep. 24, 2009, 11 pages.
Authorized Officer S. Baharlou, International Preliminary Report on Patentability for PCT/US2010/029068, dated Oct. 3, 2011, 9 pages.
Authorized Officer Y. Cussac, International Preliminary Report on Patentability in PCT/US2009/033831, dated Aug. 26, 2010, 6 pages.
Extended European Search Report in EP Application No. 10756993.1, dated Mar. 1, 2016, 7 pages.
Extended European Search Report in EP Application No. 11824001.9, dated Apr. 3, 2014, 6 pages.
Hsu, Michael. "Gear & Gadgets: Making Sense of Your Swing, Turn Your Golf Glove Into a High-Tech Coach." The Wall Street Journal, Aug. 4-5, 2012. (1 page).
International Preliminary Report on Patentability in International Application No. PCT/US2011/050498, dated Mar. 12, 2013, 6 pages.
International Preliminary Report on Patentability in International Application No. PCT/US2013/048649, dated Jan. 6, 2015, 7 pages.
International Preliminary Report on Patentability in International Application No. PCT/US2013/048958, dated Jan. 15, 2015, 12 pages.
International Search Report and Written Opinion in International Application No. PCT/US2011/050498, dated Apr. 25, 2012, 9 pages.
International Search Report and Written Opinion in International Application No. PCT/US2013/048649, dated Oct. 22, 2013, 10 pages.
International Search Report and Written Opinion in International Application No. PCT/US2013/048958, dated Sep. 27, 2013, 15 pages.
Murray, "Freescale Rolls Out World's First Intelligent Basketball," Design News Blog, Jun. 29, 2007 [retrieved May 22, 2012] Retrieved from the Internet<URL:
Raquel Urtasun, et al., "Molecular 3D Tracking of the Gold Swing," Computer Vision and Pattern Recognition, Computer Society Conference, vol. 2, pp. 932-938 (Jun. 2005) IEEE.
U.S. Appl. No. 61/028,823, filed Feb. 14, 2008, Crowley.
U.S. Appl. No. 61/164,227, filed Mar. 27, 2009, Crowley.
U.S. Appl. No. 61/164,277, filed Mar. 27, 2009, Crowley.
U.S. Appl. No. 61/249,526, filed Oct. 7, 2009, Crowley.
International Search Report and Written Opinion in International Application No. PCT/US2015/017456, dated Sep. 9, 2015, 6 pages.
International Preliminary Report on Patentability in International Application No. PCT/US2015/017505, dated Sep. 6, 2016, 10 pages.
International Search Report and Written Opinion in International Application No. PCT/US2015/017505, dated Sep. 3, 2015, 9 pages.
International Preliminary Report on Patentability in International Application No. PCT/US2015/036136, dated Dec. 20, 2016, 9 pages.
International Search Report and Written Opinion in International Application No. PCT/US2015/036136, dated Dec. 23, 2015, 8 pages.

* cited by examiner

DATA PROCESSING INSIDE GAMING DEVICE

CROSS-REFERENCE TO RELATED APPLICATIONS

This application is a continuation of U.S. application Ser. No. 15/936,218, filed Mar. 26, 2018 and pending as of the filing date of this application, and which is a continuation of U.S. application Ser. No. 14/631,109 filed Feb. 25, 2015, which claims the benefit of priority under 35 U.S.C. 119 to U.S. Application No. 61/946,702 filed Feb. 28, 2014.

TECHNICAL FIELD

This document relates to data processing performed inside a gaming device such as an inflated ball.

BACKGROUND

Athletes, whether professional or amateur, accomplished or clumsy, go to great effort to improve their athletic performance. Many spend hours and hours on the field or court. Some hire personal coaches or go to camps that take great time and are very expensive. The drive to improve athletically and to win is deeply ingrained—so deeply that many people get joy simply from watching other people compete in athletics.

Much of the effort to watch and perform in sports is very subjective, with a coach watching a student's motion in taking a shot and providing feedback on it, or with spectators making similar judgments about players in games they attend.

SUMMARY

This document describes systems and techniques that may be used to provide objective measures of athletic performance. In particular, described here are techniques by which the motion of a sporting device that is handled by an athlete, such as a ball in the form of a basketball, volleyball, or soccer ball, can be instrumented with motion sensors such as accelerometers, magnetometers, and gyroscopes, in the form of one or more inertial sensor packages. Such sensors may be located inside a ball, such as inside a shell or bladder for an inflated ball, and may move with the ball so as to sense motion imparted on the ball by one or more athletes.

Electronics that are in communication with the sensors and are also located inside the sporting device, such as in the form of a digital signal processor (DSP) and other electronics, may perform processing operations to turn the raw sensor data that does not have a meaning in the context of a particular sport, into derived data that is directed specifically to a particular sport. For example, raw accelerometer data in three axes may be converted into an indication of the g-force imparted on a ball when a player takes a shot, such as when a player dunks a basketball or kicks a soccer ball. Other raw data may be processed with certain stored assumptions about an athletic event, such as a stored a function about the release height of a basketball shot, so as to provide derived data that characterizes the shot using raw data from the sensor pack. As described in more detail below, other types of data may be generated with such an in ball processing system.

Such raw data, derived data, or both may then be provided to a computing system that is external to the ball such as by a wireless data communication formed between a wireless interface in the ball a computer outside the ball. For example, the data may be provided to a smartphone or tablet that is executing an application for causing an interface on the smartphone or tablet to communicate data with the electronics in the sporting device. Such an application may have been obtained from an online application store, such as the APPLE ITUNES STORE or the GOOGLE PLAY market, and may convert the data received from the ball into a graphical representation that may be readily viewed and interpreted by the athlete or by one or more other people, such as a coach, a referee, or a spectator of an athletic event. For example, data about the speed that a basketball shot was released, an angle of release of the basketball shot, and an amount of time between a player picking up a dribble and releasing the ball, or raising the ball and releasing the ball from a shot, may be displayed as text on a display of a smart phone or a tablet computer. Certain of the data may also be converted into a graphical form and such conversion may happen on the in-ball electronics, the computing device outside the ball, or in part on both. As one example, such electronics may compute an arc that a basketball shot took based on information received from the sensors in the ball, and the arc may be displayed in a graphical line on a background on the smartphone or tablet device. Such a displayed arc may be shown next to the best practices art that shows how the shot should have been aimed in a perfect world.

In this manner, the systems and techniques discussed here may permit for objective characterizations of the handling of the sporting device to be captured immediately and displayed in real time, for example in less than a second or 2 seconds of delay, in a visually pleasing manners on a variety of computing devices such as smart phones, tablets, heads-up displays in the form of Google glass head-mounted displays, and on other appropriate manners.

Other features and advantages will be apparent from the description and drawings, and from the claims.

DETAILED DESCRIPTION

In general, this disclosure relates to mechanisms by which data captured by a human manipulated game device by way of sensors mounted inside the game device may be processed by electronics that are also in the game device, from a form in which they are simple, raw motion data from an inertial sensor package, into a form that they are sports-specific data directed to representing particular actions in a particular type of sport, such as basketball, volleyball, soccer, or hockey. The transformations discussed here may be performed by a DSP with associated memory and may be performed on a single-chip DSP so that all mathematical manipulation of the data occurs on one chip. The memory may be provided on other chips or on the same chip, and the sensor package may be on other chips or on the same chip. All such chips may be mounted on a common motherboard inside the ball on multiple substrates. Other chips may also be provided in the ball, including wireless communication chips for providing communication with a computing device outside the ball.

The derived data that is produced by the in-ball electronics may be in a textual form transmitted as a binary code, where the text may include numbers that are human-understandable as relating to the particular sport. For example, the understandable numbers may include a number of times a basketball was bounced during a dribbling exercise, a g-force number indicating a force with which the basketball was bounced in terms of g-forces or other easily human-understandable formats, a number, in terms of degrees for an angle at which a ball was shot or a curve through which the ball curved during a shot, a number in terms of seconds or minutes between certain events that occurred in a sport. Raw data may also be transmitted outside of the ball instead of or in addition to the derived data just discussed. In certain implementations, the derived data may be data from across a relatively long period of sports activity, where such data summarizes the activities across that period. For example, the derived data may include numbers representing average force of dribbles over a time period, and other average values representing repetitive performance in a single representation.

Figure 1:
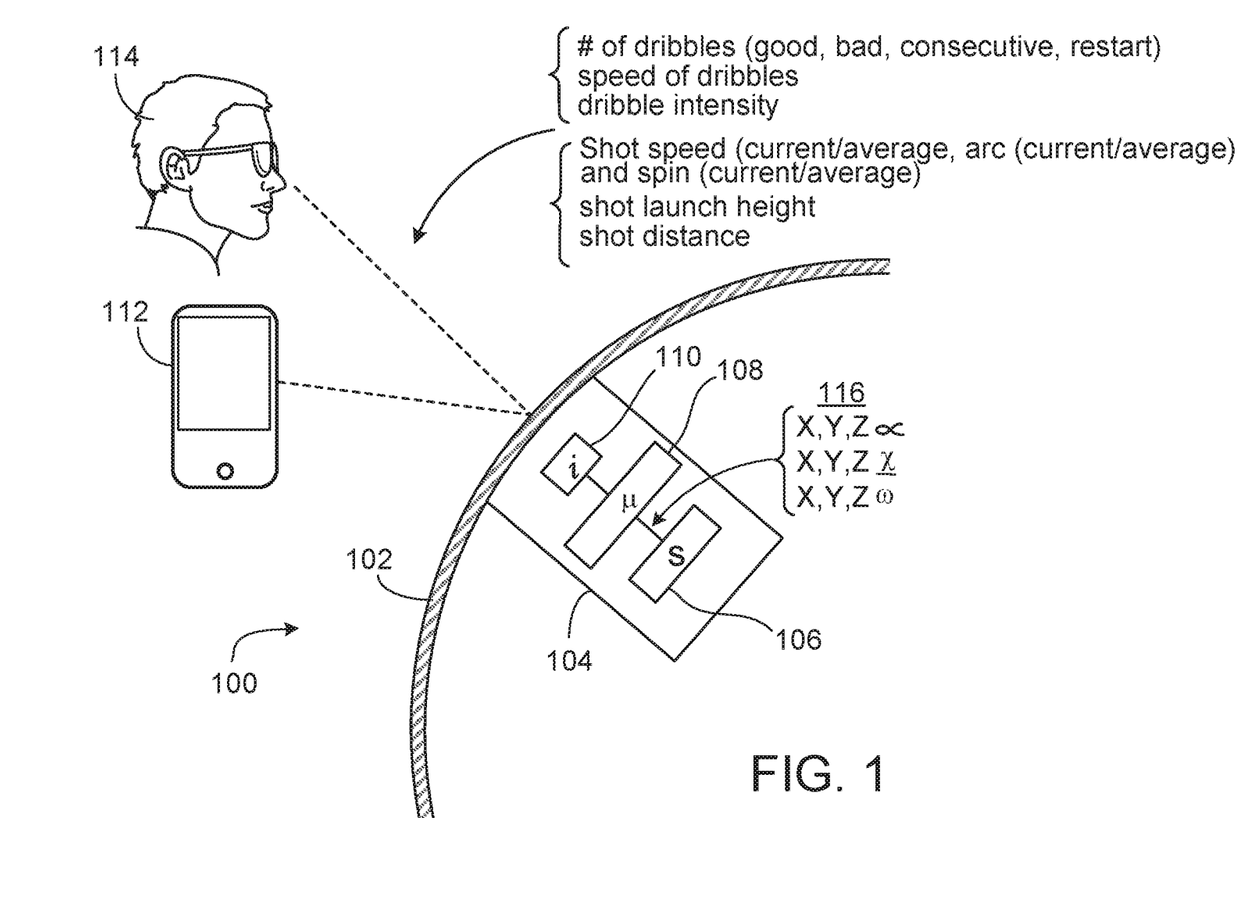
FIG. 1 an athletic ball with a processing unit that communicates with computing devices outside the ball.

FIG. 1 shows an athletic ball 102 with a processing unit 104 that communicates with a computing devices outside the ball. In general, the system 100 is provided by which the ball 102 may obtain objective information about a manner in which the ball has been moved by one or more athletes and may transmit such data, in a raw form that is not representative of athletic activity and is just generally representative of a manner in which inertial sensor systems produce data, into a derived form that is specific to a particular type of athletic endeavor. The recipient of such data may take a variety of forms such as a smartphone 112 and a head-mounted display 114, such as the GOGGLE GLASS product from Google Inc. of Mountain View, Calif.

Shown schematically inside ball 102 is processing unit 104, which may take a variety of forms and is shown in this example as a motherboard holding a number of connected chipsets and mounted solidly to the outer wall of the ball 102. The particular chipset shown in this example includes a sensor array 106, a microprocessor 108 which may take the form of a DSP, and a wireless interface 110.

The sensor array 106 may be a commercially available product that may include accelerometers, magnetometers, electronic gyroscopes, where each such instrument may sense forcer motion across three different axes, such as the X, Y, and Z axes. The sensor array 106 may include its own sensor data processor for converting, for example, analog signals into digital form and converting the digital signals into a form more representative and understandable by other electronics. For example, the sensor array 106 may produce outputs having digital values whose amplitude corresponds to the amplitude of acceleration sensed by the three different axes of accelerometers in the device. Similar signals may be provided for other parameters measured by the sensor array 106.

The processor 108 may take a variety of forms and may be connected to non-volatile memory storing instructions for performing preprocessing on the sensed data that is received from the sensor array 106. For example, the raw motion data just discussed may be converted into numbers representing particular sporting performance, such as a number of times that a basketball was bounced during a dribbling drill, a force for each bounce, averages for bounces across the multiple bounces that occurred during the drill and similar basketball-specific parameters.

The processor 108 may also have access to data memory and may store the raw motion data in such memory along with derived data from the processing just discussed. For example, a number of fields may be predefined by the software that executes on the processor, where a programmer identified those fields as being representative of a particular sport activity such as dribbling a basketball. Those fields may have corresponding fields for storage on devices 112 and 114 and thus may be wirelessly transferred from the ball 102 to the devices 112, 114. For example, a field may be provided for a number of times that a ball was bounced during a dribbling exercise, a number of times dribble was lost during the exercise, a force for each bounce in the dribbling, and an average force across all of the bounces in the dribbling, as just several examples.

The particular raw data is shown at 116 and may include X, Y, and Z axes for accelerometer data and angle or velocity data, among other things. In particular implementations, commercially available sensor arrays 106 may be obtained from a vendor and their outputs may be defined by such vendor and used to provide programming for the processor 108 to properly understand each incoming output and to process it accordingly into a form that is specific to the particular sport. Examples of such processed and derived data are shown at 114, and include, for example, for a dribbling drill, a number of dribbles in multiple fields including good dribbles, batted dribbles, or consecutive dribbles, and a number of times the athlete was forced to restart the dribbling exercise. Another field may indicate a speed of the dribbles such as a number of dribbles per minute, or a number of dribbles during the entire exercise. Yet another field may represent dribble intensity, which may be expressed in form of g-forces, average g-forces across all bounces or other manners.

As a second set of derived data, there are shown fields relating to a shot. Thus, for example, a user of device 112 may have chosen to perform an exercise that involves both dribbling and shooting, and upon the user making such a selection, device 112 may have provided a wireless communication to electronics in ball 102 causing them to gather such data upon sensing movement of the ball 100 to consistent with dribbling and shooting. The electronics in the ball may also determine when sensed motion indicates that the user has finished with the drill and upon making such a determination, may pass the data back out of the ball 102. In different implementations, data may be passed out of the ball 102 while the exercise is still occurring, or may be stored in volatile or nonvolatile memory in ball 102, processed when the exercise is completed, and then wirelessly transferred out to devices 112 or 114 upon the completion of such analysis.

In this example, the shot data is similar to that characterizing the dribbling data, and may include shot speed, shot arc, and shark shots in. In addition a shot launch height may be indicated and may have been computed in a variety of manners by electronics in ball 102. As a third instance of derived data, a shot distance may have been computed from various other measurements made by the ball electronics when the user took one or more shots as part of an exercise.

Figure 2:
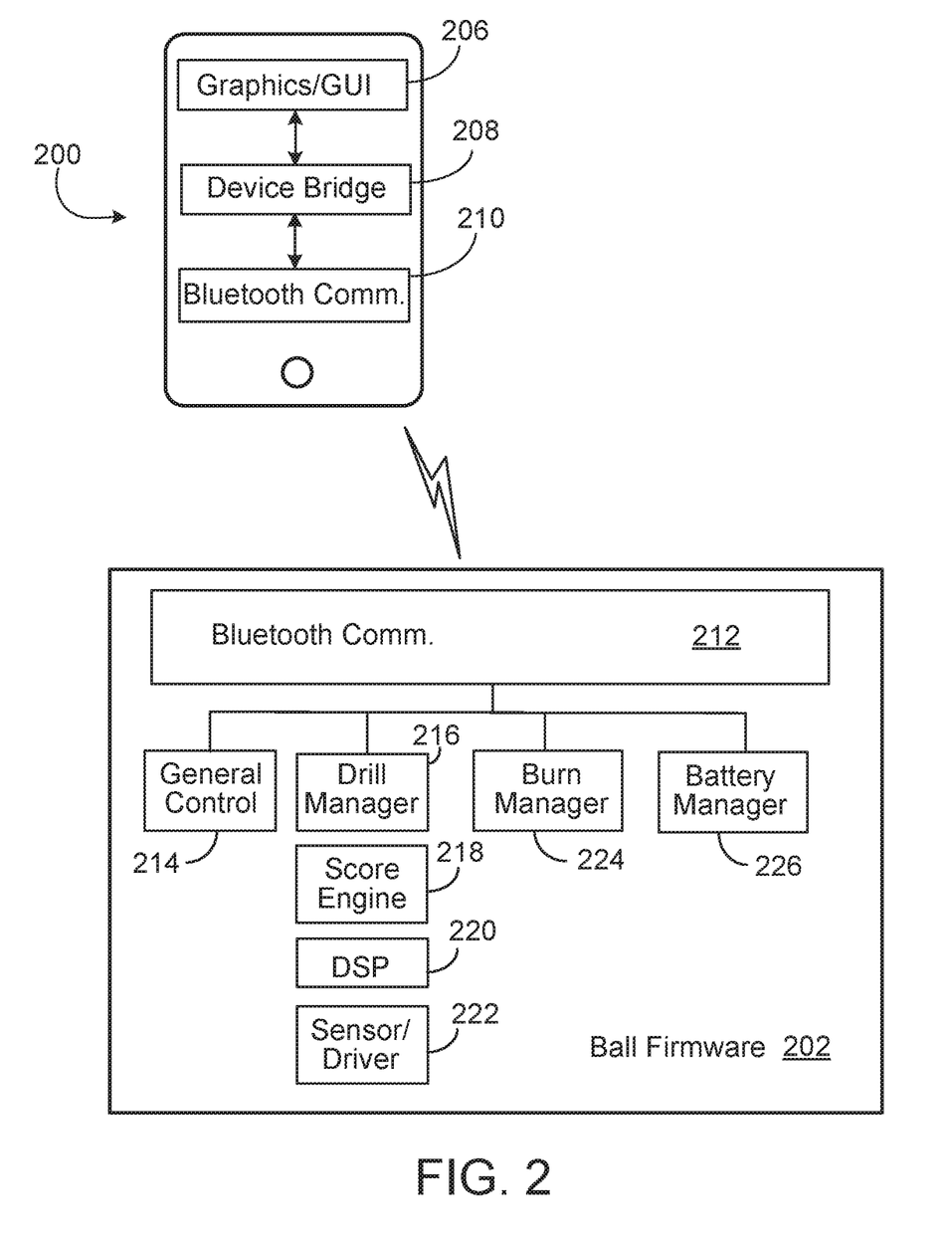
FIG. 2 is a schematic diagram of structural components of electronics in a game ball and a mobile computer.

FIG. 2 is a schematic diagram of structural components of electronics in a game ball and a mobile computer. In general, a system 200 shows a mobile device 204 such as in the form of a smartphone or other similar device that is commercially available for purchase by athletes and other users, and ball firmware 202, which may be loaded on electronics mounted inside a ball, such as ball 102 in FIG. 1.

Starting with mobile device 204, there is shown a graphics GUI module 206 that may be part of an application that has been loaded on mobile device 204 and obtained by a user from a public application marketplace, for free or for a monetary fee. The graphics GUI module 206 may be responsible for converting textual data into a graphical form which may include visually-pleasing text in different fonts or in a drawn font, in addition to one or more graphics, animations, or videos that represent data that has been captured in a ball is providing the data to the mobile device 204.

A Bluetooth communication interface 210 in the mobile device 204 may include hardware and firmware and software that is intrinsically part of mobile device 204 and, in a familiar manner, converts wireless transmissions to data that can be used by one or more applications on the mobile device 204. A device bridge 208 performs a conversion that is needed for the graphics GUI module 206 to understand and work with the data that has been received by way of Bluetooth communication module 210.

Where the ball firmware 202 has performed extensive pre-processing of raw data received on a ball, the mobile device 204 may not need to perform substantial processing and may simply need to convert text such as in the form of representative athletic numbers, into graphics that improve the presentation of the data to a user so that such presentation is not merely color less single font graphics in a simple tabular form.

Referring now to the ball firmware, there is a Bluetooth communication module, which may take the form of commercially available hardware in the form of a chip programmed with firmware, software, or both for forming a Bluetooth connection with one or more devices in an area of the ball firmware 202 on a ball and for mediating a communication session in two directions with such devices.

A number of components are allowed to communicate using the Bluetooth communication module 212, such as a general control module 214. The general control module 214 may be programmed to execute on a processor of a device to manage communications between the device and a remote device, to provide necessary information to the remote device, and to coordinate the operation of other components of the ball firmware 202.

A drill manager 216 may be programmed to identify a drill that is to be sensed by the device, and to gather appropriate data from a sensor package in the form of an inertial sensor system for carrying out and characterizing the particular drill. A score engine 218 may be used to convert raw data obtained by the sensor package into particular scores in predefined fields or parameters that are directly related to a particular sport and activity that was performed with the ball with respect to such sport. A digital signal processor 220 is provided to perform traditional digital signal processing operations, including data manipulation with numerical data in the form of the raw data obtained by the sensor package. The sensor driver module 222 may also be accommodation of hardware, firmware, and software, and may be provided on a discrete chip or chips that are commercially available in a variety of forms.

A burn manager 224 may manage the storage of information in various forms of data on the device in one or more types of memory, while a battery manager 226 may manage the charging and discharging of a battery mounted within the ball that includes the electronics. For example, the battery may be charged by an inductive loop that receives energy from a loop outside the ball when the inductive loop is placed nearby the loop that is outside the ball. The battery manager 226 may control the amount of such energy that is provided to the battery, the speed with which the battery is charged and discharged, the level to which the battery is charged and discharged and other familiar battery management mechanisms. As with particular ones of the other modules, the battery manager 226 may be a commercially available chips or chips for providing low-power battery management services.

Figure 3:
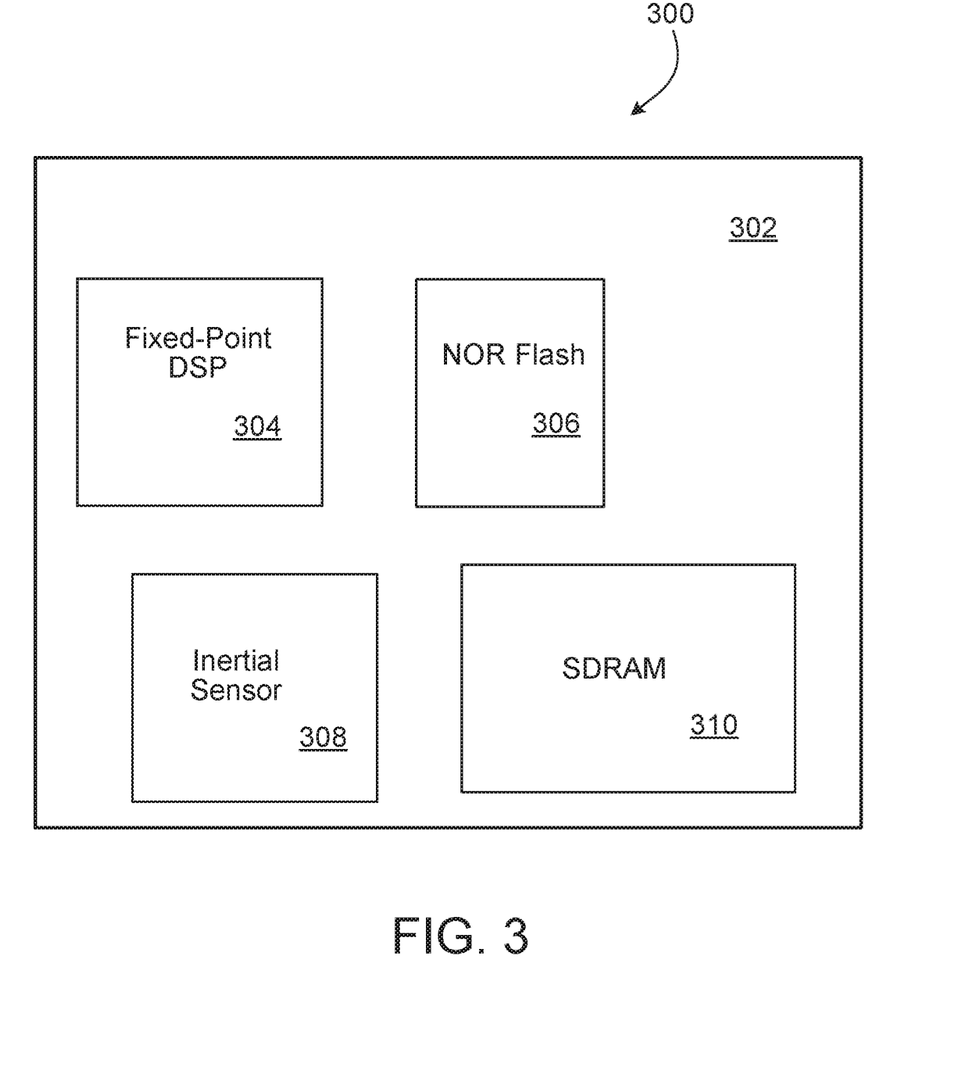
FIG. 3 shows a partial circuit board layout for in-ball electronics.

FIG. 3 shows a partial circuit board layout for in-ball electronics. In general, a system 300 and may be mounted inside an inflatable sports ball is shown in the form of a circuit board 302 having a number of discrete chips mounted thereto. The particular arrangements of the chips will vary from implementation to implementation and will typically involve a number of additional supporting electronic components that are all made it here for clarity. As discussed further below, additional chips that are not shown here may also be provided, such as on the back side of circuit board 302 or as part of a circuit board 302 having different dimensions and alongside the other components shown here.

Fixed point DSP 304 is a digital signal processor that is a primary processor for the system. The DSP 304 may use firmware loaded on it to control all other components in the system 300 and process received raw sensor data into derived data in the form of key performance metrics for the particular sport that is being measured. DSP 304 may take the form, for example of a Texas instruments TMS320C5515AZCH10-C5515 digital signal processor available from Texas Instruments Inc.

SDRAM 310 is external RAM that expands high-speed memory that is available on the DSP 304. Such SDRAM 310 may be provided if RAM on DSP 304 is insufficient for the needs of the processing intended to be performed by DSP 304. Such RAM may be used to store program code, sensor data, or both. Generally, the SDRAM is a volatile memory and thus may be used to store various forms of the motion data during the processing operation. Where all of the necessary SDRAM is on DSP 304, the processing of the motion data may occur on such single chip without additional communications to other chips during the processing other than to provide input from the inertial sensor and output to one or more wireless communication structures. SDRAM 310 may take a variety of forms including the micron MT48H4M16LFB4-8 IT:H.

NOR flash 306 is external flash memory where firmware may be stored in a non-volatile form. Such memory may store both bootloader firmware as well as main program firmware that may be loaded onto DSP 304 for performing the data analysis described above and below. NOR flash 306 may take a variety of forms, such as the Micron M28W320FCB70ZB6E.

Inertial sensor 308 with its included sensor data processor may be one of three integrated circuits in system 300 that sent inertial motion from this component, acceleration along three axes, angle or velocity about three axes, and three axes magnetometer data can be collected for providing to the DSP 304. The inertial sensor 308 may also perform calibration an inertial motion calculations such as estimating object orientation and object no motion event. In certain implementations, the inertial sensor 308 may be used for raw acceleration data along three axes an angular velocity about three axes. Such a device may take the form of a InvenSense MPU-9150.

Not specifically shown here, but which may be provided on the backside of motherboard 302 or in other locations are a wireless charging integrated circuit which may manage the wireless battery charging, including inductive charging, from a base station. Such a device may take the form of a Texas instruments BQ51014YFPT. In addition, a Bluetooth radio may be provided which is capable of Bluetooth communications using Bluetooth classic or Bluetooth low energy communication standards such a device may take the form of a Texas instruments CC2564RVMR. In appropriate circumstances, a separate magnetometer may be provided providing three axes data, and may take the form, for example, of a Honeywell HMC5983. Moreover, a three axis accelerometer integrated circuit package may be provided that may sense acceleration along three axes. Such a device may also be configured to sensed simple motion event such as impact freefall, and double tap. Such component may also be provided to wake up the system, such as by sensing that a ball that has been nonmoving for a long. Has suddenly been bounced a certain number of times or otherwise manipulated in a predetermined manner by an athlete. Such a component may take the form of a ST Microelectronics LIS 3DH. Each of the sensors contains internal analog to digital converters that produce 16-bit integer outputs to be processed by other components in the system.

The DSP 304 serves as the master device in the system 300. Upon startup, such as occurring by sensing a predetermined motion of the sporting device by one of the sensors, firmware is loaded from the NOR flash 306 into the RAM of the DSP 304. The DSP 304 then configures the communication between all other integrated circuits on the board 302. The DSP 304 controls the sensors, such as inertial sensor 308, to collect synchronized accelerometer, angle or rate gyro.

The system 300 connects over a Bluetooth link to a remote mobile device, such as a device operating the IOS or android operating system. Data analysis begins when such a mobile device communicates a packet telling the system 300 to start an activity. The payload of such a packet may pass configuration parameters to the system 300. The command may signal the ball or the electronic shown here that the mobile device is expecting to receive notification about the balls current activity. Once the command is received and the DSP 304 begins collecting and processing sensor data, such data may be passed back to the requesting mobile device. The DSP 304 may collect the data in a variety of forms, such as at 1024 Hz from the accelerometer and Angel or rate gyroscopes, and synchronize such data with 200 Hz data from the magnetometer.

The raw data from the sensors, such as inertial sensor 308 may be stored in a circular buffer in the DSP 304 memory, or in SDRAM 310 when such additional memory is required. The circular buffer may hold a certain period of data, such as one, two, three, four, or five seconds of data. The raw sensor data may be initially filtered and then analyzed continuously. The filter data buffer may be passed through complex logic and statistical correlations to identify key timing events, such as contact of a basketball with the floor, with a user's hands, or other events that represent, for example, the start or end of a particular process as part of an athletic action, or the occurrence in time of a particular athletic action. The derived data from such analysis may be sent to the remote mobile device in near real-time, such as within a single digit number of seconds of the data being captured.

The activity notification packets that are transferred from the system 300 back to the mobile device are arranged to require little to no processing on the mobile device in certain implementations. In particular, the values of data that are provided to the mobile device may be left unchanged by the mobile device between their receipt and their display. The mobile device may instead be asked only to provide formatting for such display. For example, the mobile device may turn a series of numbers into a graphical display, such as a line graph or other such display, though the mobile device would not manipulate the numbers into another and different numerical representation.

Figure 4A:
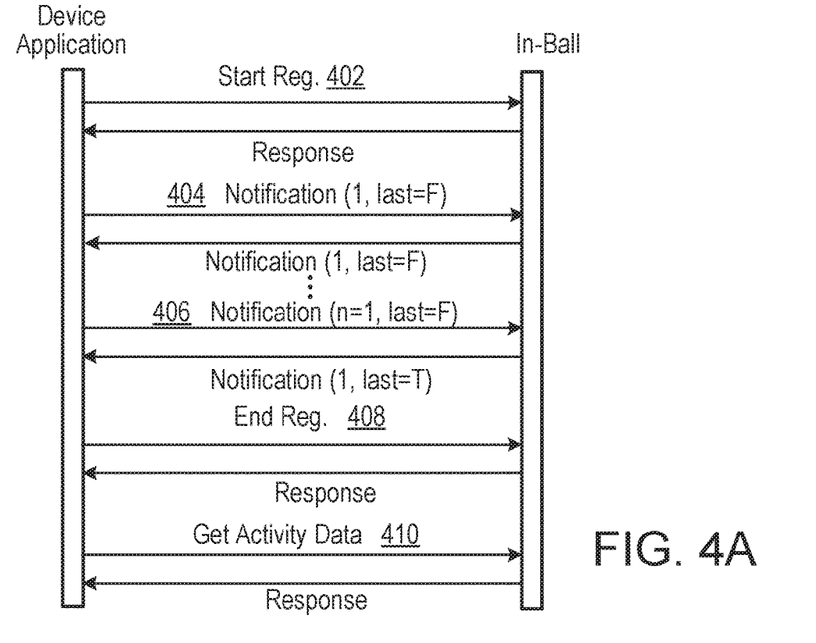
FIGS. 4A and 4B are activity diagrams showing communications with in-ball electronics.
Figure 4B:
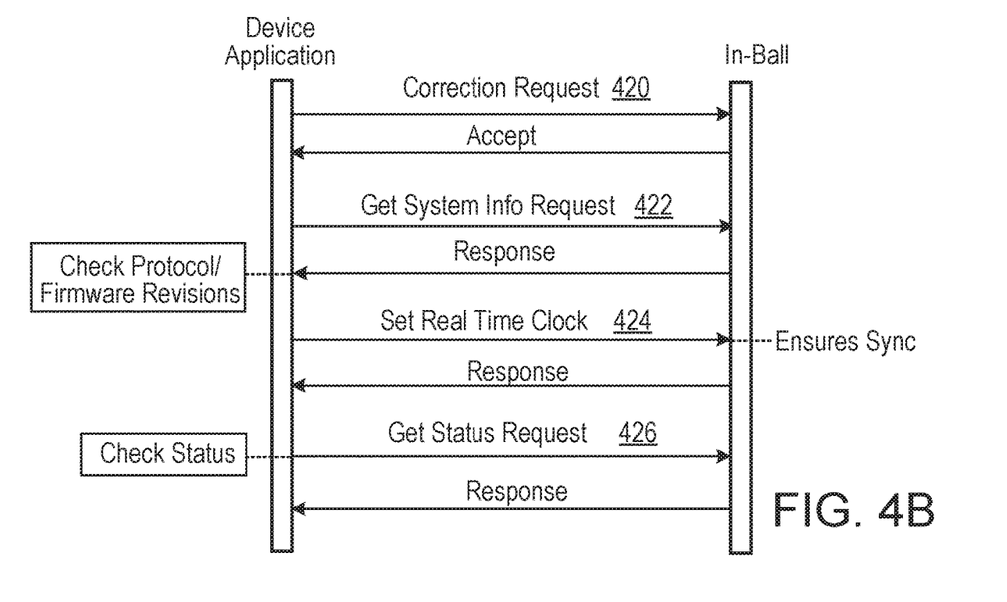

FIGS. 4A and 4B are activity diagrams showing communications with in-ball electronics. In general, FIG. 4A shows the passing of motion data between an application on a mobile device and in ball electronics, such as in a basketball. The process begins at step 402, where the device application sends a start request to the electronics in the ball and those electronics respond to indicate that they received the request. At step 404, a first notification is sent by the device application and is responded to by the in-ball electronics such request and response repeats a number of times to step 406 where he last request is made. Each of the requests may define a number of parameters for data to be returned by the electronics in the ball, such as by identifying a form of sport exercise that expect is expected to be performed by the ball. In other instances, such as when data is being streamed off a ball throughout a competition game, an initial command may be provided from a remote device to begin the streaming in the ball may continuously pass data off and determine key events indicated by the motion of the ball, such as by automatically determining when dribbling is occurring, when a shift to shooting or passing has occurred and other such data.

At step 408, an end request is provided and responded to, and indicates that the device application would like the ball to stop performing the data capture and analysis that is been performing. At step 410, a get activity data command is provided in your responses provided in return. For example certain data may be passed off the ball while it is still being manipulated, and the get activity data command 410 may cause additional stored data to be passed from the ball to the device application.

FIG. 4B generally shows maintenance communications between a device application in the in-ball electronics. The process begins at step 420 where a connection request is provided and accepted. Such a request may take a familiar form and may be of a form defined for a standard such as the Bluetooth standard. At step 420 2A gift system info request is provided and responded to, by which the in-ball electronics may communicate information about their capabilities and configuration. Such information may include, for example, a version of firmware or other information that may be checked by the device application to assure that the firmware has been up dated, and if it has not been updated, the device application may provide an update after downloading it through a wide area network.

At step 420, a set real-time clock command may be provided to the in-ball electronics and responded to. The in-ball electronics may then set their clock to be synchronized with a clock in the device application to ensure a tight synchronization between the two clocks during subsequent operations and communications between the two. At step 426, a get status request is provided and responded to by which the in-ball electronics may report the status of the ball, where such status may include indicating that the ball is at rest, the ball is undergoing motion, the ball electronics are lacking in sufficient electrical power, and other status information a variety of forms.

Figure 5:
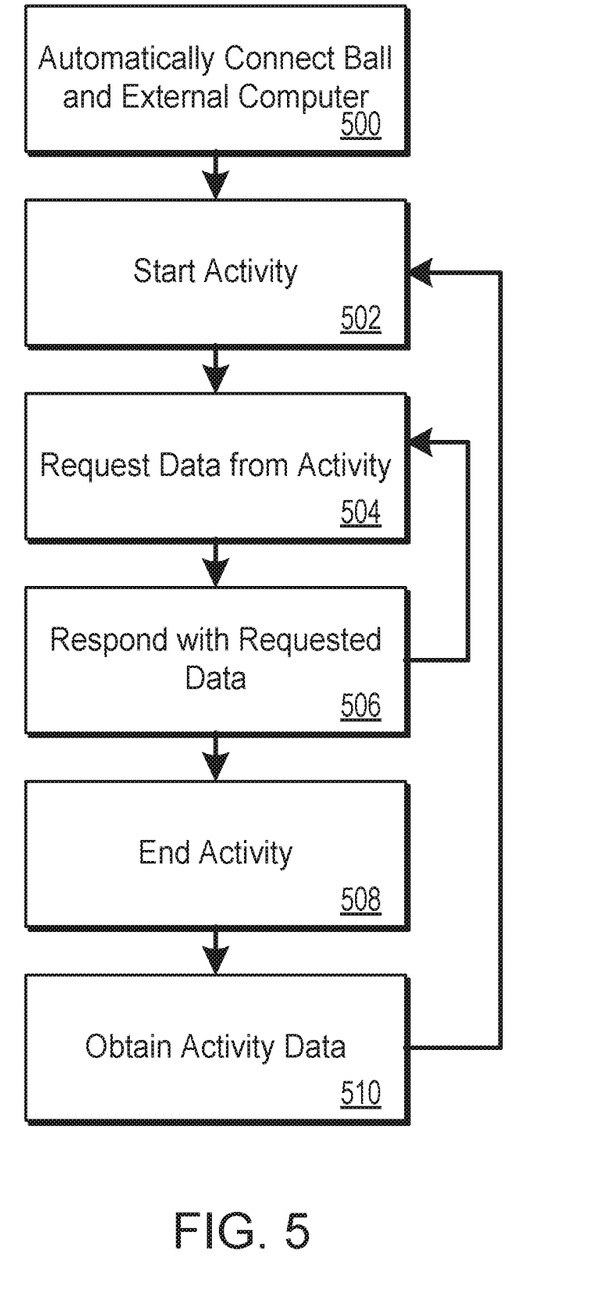
FIG. 5 is a process for generating a presentation from game ball motion data.

FIG. 5 is a process for generating a presentation from game ball motion data. In general, the process involves forming a communication session between electronics in a sporting device and electronics in a computing device outside the sporting device, so as to pass data that has been processed inside the sporting device to the electronics outside the sporting device for display or other presentation to a user, such as an athlete or spectator wearing head-up glasses displays so as to see numerical or graphical representations that indicate objective, measured data, including data measured by sensors in the sporting device.

At step 500, a ball and external computer are automatically wirelessly connected. Such connection may take a familiar form such as a handshake according to a known and common protocol, such as Bluetooth. At step 503, an activity with the ball starts. Such activity may be initiated by an operator of the external computer interacting with an application on the external computer so as to cause an initiation command to be passed to electronics in the ball. The ball may then load firmware and begin monitoring data being generated by various sensors in the ball in a looping and continuous manner, and processing such raw data to produce derived data like that discussed above.

At box 504, a request for the processed data is provided from the external computer to the in-ball electronics, and at box 506, it is responded to. Such request and response may occur repeatedly and essentially continuously, or the in-ball electronics can provide data continuously for a long period in response to a single request and continue until a "stop" request is received. At box 508, the activity ends. For example, the in-ball electronics may identify from the data that sports-related motion of the ball has stopped (e.g., the ball has been placed on a cart for half-time), or the computer may provide a command to cause the in-ball electronics to stop collecting and processing data.

At box 510, activity data is obtained from the in-ball electronics to the external computer. Such recovery of data may occur, for example, when data was not obtained while the ball was being handled or may be obtained in addition. Also, a sub-set of the obtained raw data or derived data may be transmitted while the activities are ongoing, and the rest may be transmitted after the activity is determined to have stopped.

The particular techniques described here may be assisted by the use of one or more computers, such as wearable computers (e.g., in the form of glasses with a heads-up display), servers, desktops, smartphones, and tablets. The computing portions of such devices are shown generally in FIG. 6, and may communicate with and/or incorporate a computer system 600 in performing the operations discussed above, including obtaining and processing incoming motion data, and formatting and presenting information from such data in a tabular or graphical manner that is pleasing and useful to a view with a head-mounted display.

Figure 6:
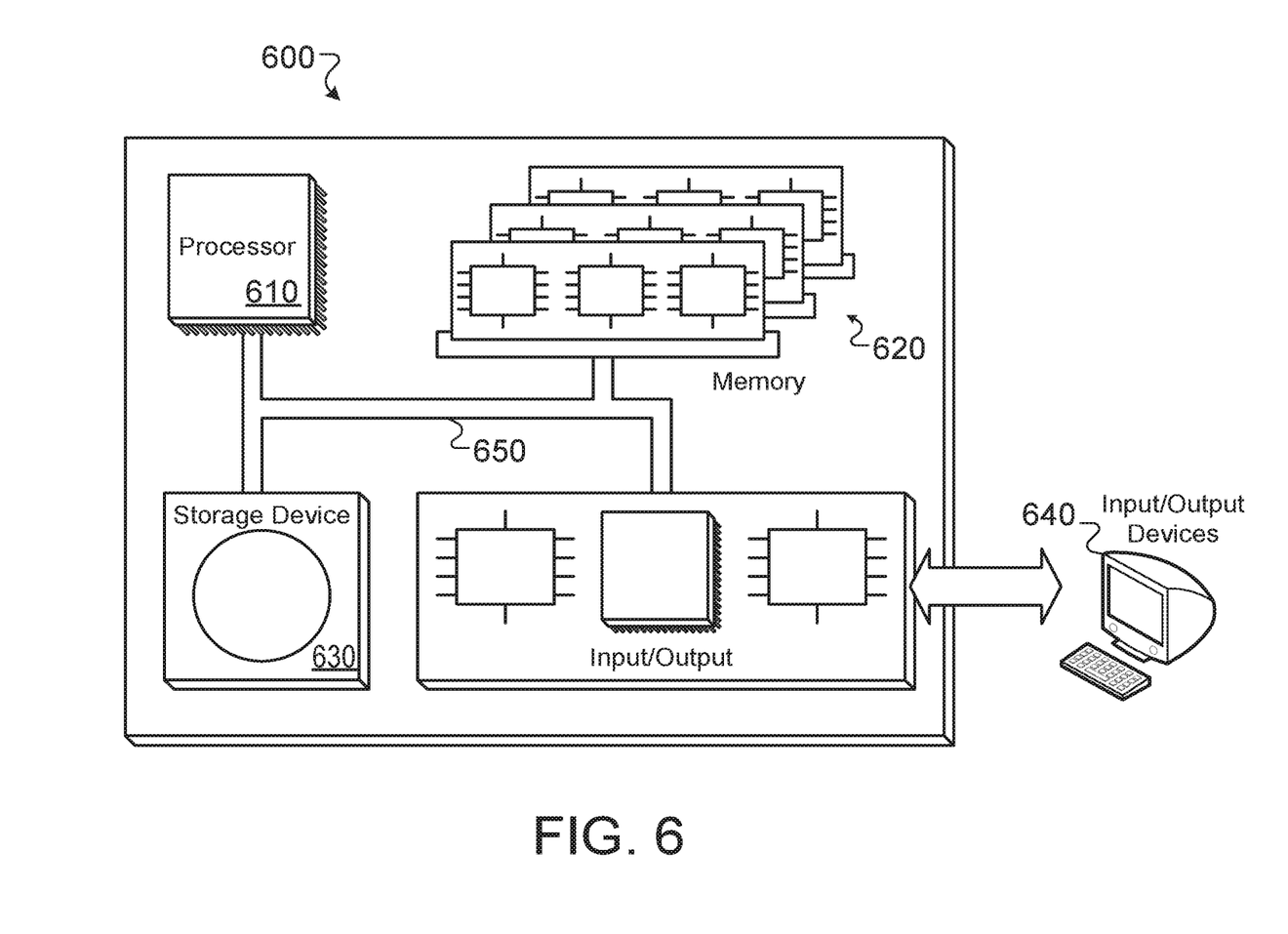
FIG. 6 shows a general computer system that can provide interactivity with data regarding a sporting event.

The system 600 may be implemented in various forms of digital computers, including computerized laptops, personal digital assistants, tablets, and other appropriate computers. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600.

The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having an LCD (liquid crystal display) or LED display for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Many other implementations other than those described may be employed, and may be encompassed by the following claims.

What is claimed is:

1. A computer-implemented method for obtaining motion about a sports object having a sensor and a transceiver, the method comprising:

receiving a packet from a device external to the sports object having instructions to begin capturing data, instructions for configuring at least one parameter of the sensor, and a request for returned data, wherein the returned data is provided in a form presentable for display on the device external to the sports object;

configuring the sensor based on the instructions received in the packet;

initiating data capture using the sensor;

capturing raw data about motion of the sports object caused by one or more athletes manipulating the sports object;

converting, with a computer system inside the sports object, the captured raw data, into returned data and wirelessly transmitting the returned data to the device external to the sports object.

2. The computer-implemented method of claim 1, wherein returned data comprises one or more fields that are predetermined to relate to motion for a particular sport.

3. The computer-implemented method of claim 2, further comprising maintaining a plurality of fields that each correspond to an aspect of a particular sports action, and storing the returned data in each of the plurality of fields.

4. The computer-implemented method of claim 3, further comprising storing the raw data on the sports object in at temporary memory in addition to, and in a different location than, the returned data.

5. The computer-implemented method of claim 1, wherein the device external to the sports object comprises a pair of glasses having an electronic head-up display for presenting returned data transmitted by the sports object.

6. The computer-implemented method of claim 1, wherein the returned data comprises data indicating an angle that a shot with the sports object was released and a speed with which the sports object was released.

7. The computer-implemented method of claim 1, wherein the device external to the sports object is a mobile phone comprising an application communicating with the sports object.

* * * * *